April 7, 1942. T. C. ZOLIK 2,278,683
HEATING DEVICE
Filed Nov. 27, 1940
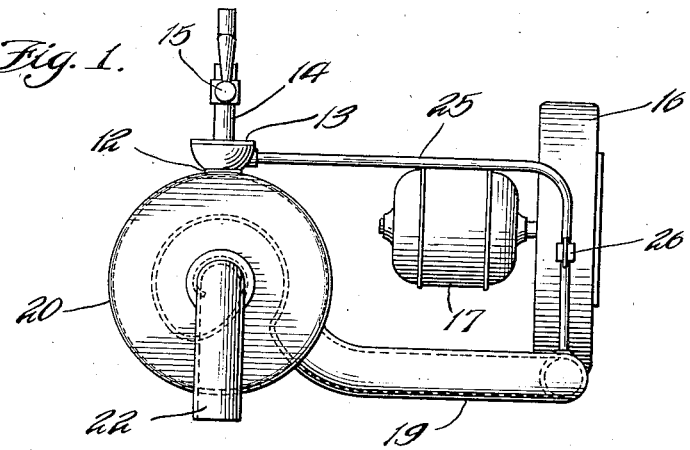
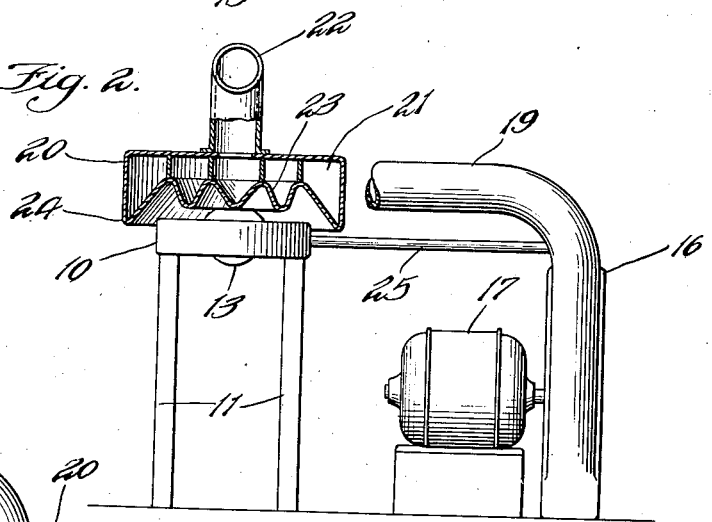
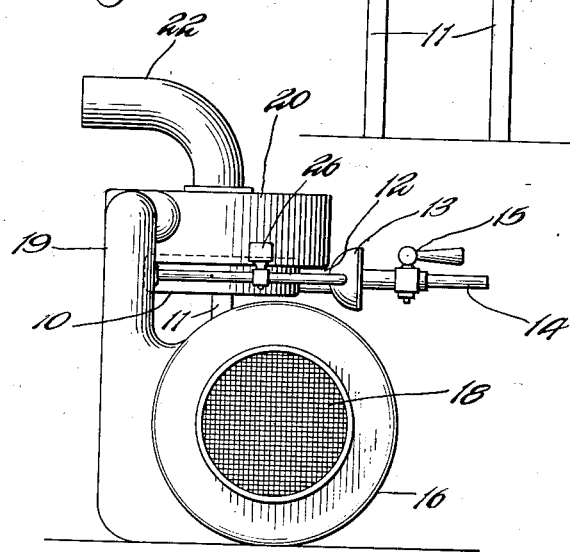
INVENTOR.
Thomas C. Zolik Patented Apr. 7, 1942

2,278,683

UNITED STATES PATENT OFFICE 2,278,683

HEATING DEVICE

Thomas C. Zolik, Chicago, Ill.

Application November 27, 1940, Serial No. 367,345

3 Claims. (Cl. 126—110)

The present invention relates to heating devices and has for its object the provision of a compact heating unit, and which may be of a very simple construction and which would have a high degree of heating efficiency.

A still further object of the present invention is the provision of a heating device of the character indicated wherein a heating chamber may be provided with means to retard the flow of air until it had time to become completely heated by a suitable burner, before escaping to the portion of the dwelling intended to be supplied with heat.

A still further object of the present invention is the provision in a heating device of the character indicated, of a suitable unit including an associated fluid fuel and air mixing chamber, and into which air mixing chamber the air may be supplied under force by the same impelling means as is used to supply air to the heating chamber.

It is a further object of my invention to provide a circulator unit for propelled air adapted to be positioned over a heat source or combustion unit wherein such combustion unit may utilize any known fuel such as gas, fuel oil, or the like, and wherein said air circulator unit is in heat exchange relation with the fuel unit. It is a further object to provide an air circulator unit for circulating air in heat exchange relation with the heat of the fuel source which air circulator unit includes irregular wall or walls which include downwardly extending members which are substantially separated or spaced from each other by recesses or grooves to thereby bring to the burning fuel the maximum surface area for heat absorption.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views;

Fig. 1 is a top elevational view of the present device;

Fig. 2 is a side elevational view of the device, partly in section; and

Fig. 3 is an end elevational view of the device.

Referring in detail to the present drawing, there is shown therein a burner 10 supported by legs or like members 11. Connecting with said burner 10 by means of pipe 12 is an air and fuel mixing chamber 13, and connecting with the latter is pipe 14 adapted to supply gas or other fluid fuel into said mixing chamber 13. Said pipe 14 is provided with valve 15 for the purpose of either shutting off the supply of fuel or to regulate the amount thereof.

The device further includes an air blowing chamber 16 within which any known air blower may be positioned to be driven by any suitable power such as motor 17. One face of said blower chamber 16 is preferably opened and screened as at 18 through which air is supplied into said blower chamber 16.

Integrally formed with said blower chamber 16 is air pipe 19, which leads vertically and then horizontally, the horizontal portion thereof connecting with an air heating chamber 20. Said air heating chamber 20 is in effect a continuation of air pipe 19, and has a substantially spiral air passage 21, the centermost portion of which connects with an outlet pipe 22 through which the heated air is led into the dwelling or any portion thereof intended to be heated. The bottom wall of heating chamber 20 is serrated, recessed or ridged to form grooves or recesses designated as 23. This recess or groove may vary in depth or shape as well as number, and may, if desired, extend substantially to adjacent the upper wall of air heating chamber 20. Further, I desire it to be understood that in the preferred form of my invention illustrated in the drawing the air passage 21 is substantially spiral and that the recesses or grooves which enlarge the heat exchange surface generally extend in directions to generally define a substantially spiral shape following the spiral passage 21, for the purpose of increasing the heat exchange area of the bottom wall of said air heating chamber 20 so as to increase the heating efficiency of said chamber. The outermost ridge or recess 23, corresponding to the lower marginal portion of heating chamber 20 is illustrated as made longer than the ridge in the innermost spiral passage 21 so as to provide a downwardly depending flange 24 so as to retard the escape from under the bottom of heating chamber 20, of hot combustion gases or flames, so as to receive the utmost benefit therefrom insofar as heating air which is circulated in said heating chamber is concerned.

This illustrated feature of a larger outermost ridge is optional, though actually not essential to efficient operation of my unit.

The outermost annular vertically extending wall of the chamber 20 is illustrated as so shaped as to partially encircle the area of fuel combustion, to partially enclose the area of combustion beneath the air heating chamber 20. I desire it to be further understood that the size and shape of flange 24 may be varied to best adapt it to the particular type of fuel being employed and according to the volatile gaseous content of the fuel used.

Thus it will be seen that the centermost bottom of heating chamber 20 in conjunction with flange 24 will form a pocket or downwardly opening compartment wherein the hot air and combustion gases from burner 10 will gather and effect greater heat exchange between the same and chamber 20, and will impart greater amount of heat to the bottom of heating chamber 20 before they are allowed to escape past flange 24 into the atmosphere.

Connected at the vertical portion of pipe 19 is a smaller pipe 25 through which a portion of air will be forced to pass to mixing chamber 13 with which said pipe 25 connects at its other end. Said pipe 25 is provided with valve 26 by means of which the supply of air to mixing chamber 13 may be either entirely shut off or the amount thereof regulated.

Assuming that fluid gaseous fuel passing through pipe 14 into mixing chamber 13 is forced into the latter under certain pressure, by regulating valve 26 a desirable air supply within given time to correspond with the amount of fuel supplied through pipe 14 into mixing chamber 13 may be had and best efficiency insofar as mixing of air with fuel within mixing chamber 13 may be maintained.

It is noted that in order to convert the present device into a cooling unit, burner 10 may be substituted by a cooler to act upon chamber 20 for cooling the air.

In such case, the cooler may be of suitable shape so that the air chamber 20 and the cooler through which the flowing cooling medium is circulated may be placed in direct contact and to thereby effect heat exchange between the two units.

While there is described herein a preferred embodiment of the present invention, it is nevertheless to be understood that changes may be made therein without departing from the spirit and scope of the invention as claimed.

What I claim as new is:

1. In combination, a fuel burner, an air heating chamber arranged above said burner, said chamber having an intake and a heated air outlet, means for supplying air to said air intake, a spiral partition arranged in the chamber, a spiral upstanding ridge arranged on the bottom of the chamber, said spiral partition extending from the top of the chamber to the top of the spiral ridge to form a circuitous passage for the air passing through the chamber before the heated air is discharged through the outlet.

2. In combination, a fuel burner, an air heating chamber arranged above said burner, said chamber having an air intake and a heated air outlet, means for supplying air to said air intake, a spiral partition arranged in the chamber, a spiral upstanding ridge arranged on the bottom of the chamber, said spiral partition extending from the top of the chamber to the top of the spiral ridge to form a circuitous passage for the air passing through the chamber before the heated air is discharged through the outlet, the outermost portion of the spiral ridge extending downwardly further than the inner portions of said ridge so that the lower outer edge portion of the chamber encompasses the fuel burner.

3. In combination, a fuel burner, an air heating chamber arranged above said burner, said chamber having an air inlet in the side thereof and a heated air outlet in its top central portion, a blower for delivering air to the air inlet, a spiral upstanding ridge formed on the bottom of the chamber, a spiral partition in the chamber extending from the top thereof to the top of the spiral ridge to form a circuitous passage for the air passing through the chamber before the heated air is discharged through the outlet, and means for delivering some of the air from the blower to the fuel burner.

THOMAS C. ZOLIK.